(12) United States Patent
Chen

(10) Patent No.: US 8,253,067 B2
(45) Date of Patent: Aug. 28, 2012

(54) METHOD OF MACHINING A ROLLER

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 328 days.

(21) Appl. No.: 12/777,410

(22) Filed: May 11, 2010

(65) Prior Publication Data

US 2011/0155704 A1    Jun. 30, 2011

(30) Foreign Application Priority Data

Dec. 28, 2009   (TW) ............................... 98145399 A

(51) Int. Cl.
*B23K 26/00*   (2006.01)
(52) U.S. Cl. .............................. 219/121.72; 219/121.67
(58) Field of Classification Search ............. 219/121.72, 219/121.67
See application file for complete search history.

(56) References Cited

U.S. PATENT DOCUMENTS

| | | | | |
|---|---|---|---|---|
| 5,255,199 A | * | 10/1993 | Barkman et al. | 700/175 |
| 5,416,298 A | * | 5/1995 | Robert | 219/121.68 |
| 6,216,512 B1 | * | 4/2001 | Irie | 72/121 |

\* cited by examiner

*Primary Examiner* — Roy Potter
(74) *Attorney, Agent, or Firm* — Altis Law Group, Inc.

(57) ABSTRACT

A method of machining a roller utilizes a laser machining system is disclosed. The roller includes a main body and two spindles extending from opposite end surfaces of the main body. The laser machining system includes a laser device, an adjustment device, and a controller. The laser device scans the position of the roller and sends a scanned signal to the controller. The controller analyzes the scanned signal, and if the roller is positioned at the exact position, the controller will send a signal to the laser device, and then the laser device begins to machine the roller. If not, the controller will send a signal to the adjustment device, the adjustment device adjusts the roller to the exact position, then the controller sends a signal to the laser device, and the laser device begins to machine the roller.

8 Claims, 5 Drawing Sheets

METHOD OF MACHINING A ROLLER

BACKGROUND

1. Technical Field

The present disclosure generally relates to a method of machining a roller.

2. Description of Related Art

A roll-to-roll process providing enhanced manufacturing efficiency and lower manufacturing cost is often employed to produce brightness enhancement films or light guide plates in mass quantities. A roller for embossing or imprinting arrays of structural features, such as a plurality of micro-structures, is applied to a flexible sheet or film, to imprint or emboss a plurality of micro-structures thereon. A new flexible substrate, or film, can be rolled for a subsequent imprint, or the rolled flexible sheet or film can be cut to a requested size and shape. However, the micro-structures of the roller are often formed by machining, electroplating or etching. When the micro-structures of the roller are very small, such methods can require more complicated arrangements, and processes having increased costs, and also added complexity.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

A method of machining a roller is described in the following.

Figure 1:
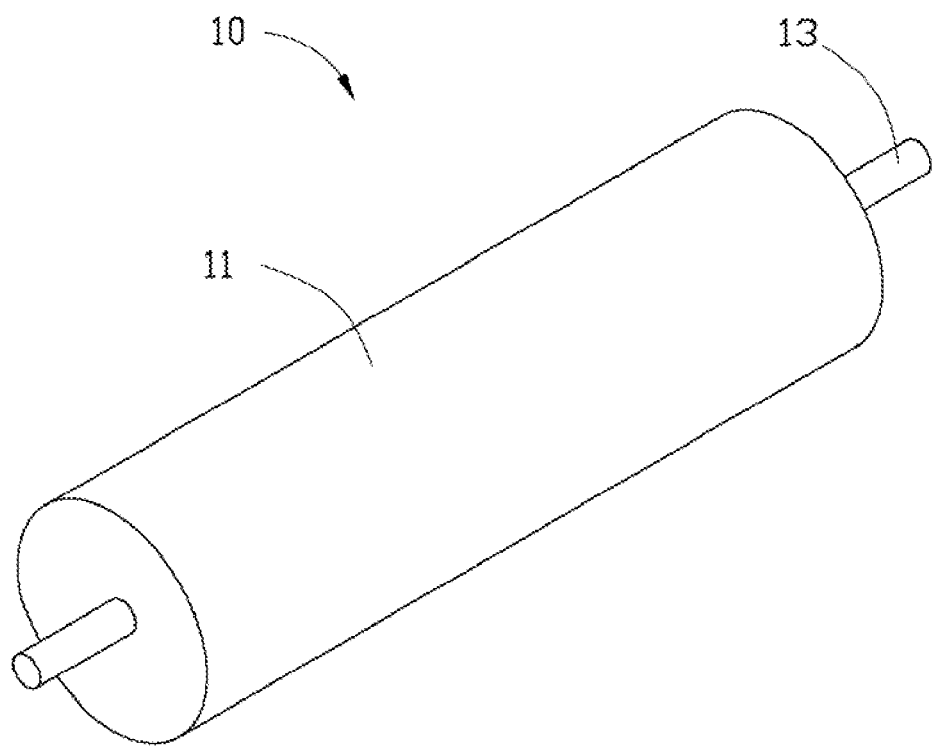
FIG. 1 is an isometric view of a roller.

Referring to FIG. 1, a roller 10 is provided. The roller 10 includes a main body 11 and two spindles 13 extending from opposite end surfaces of the main body 11. The main body 11 and the spindles 13 are columnar or cylindrical and coaxial. A diameter of each spindle 13 is less than the diameter of the main body 11.

Figure 2:
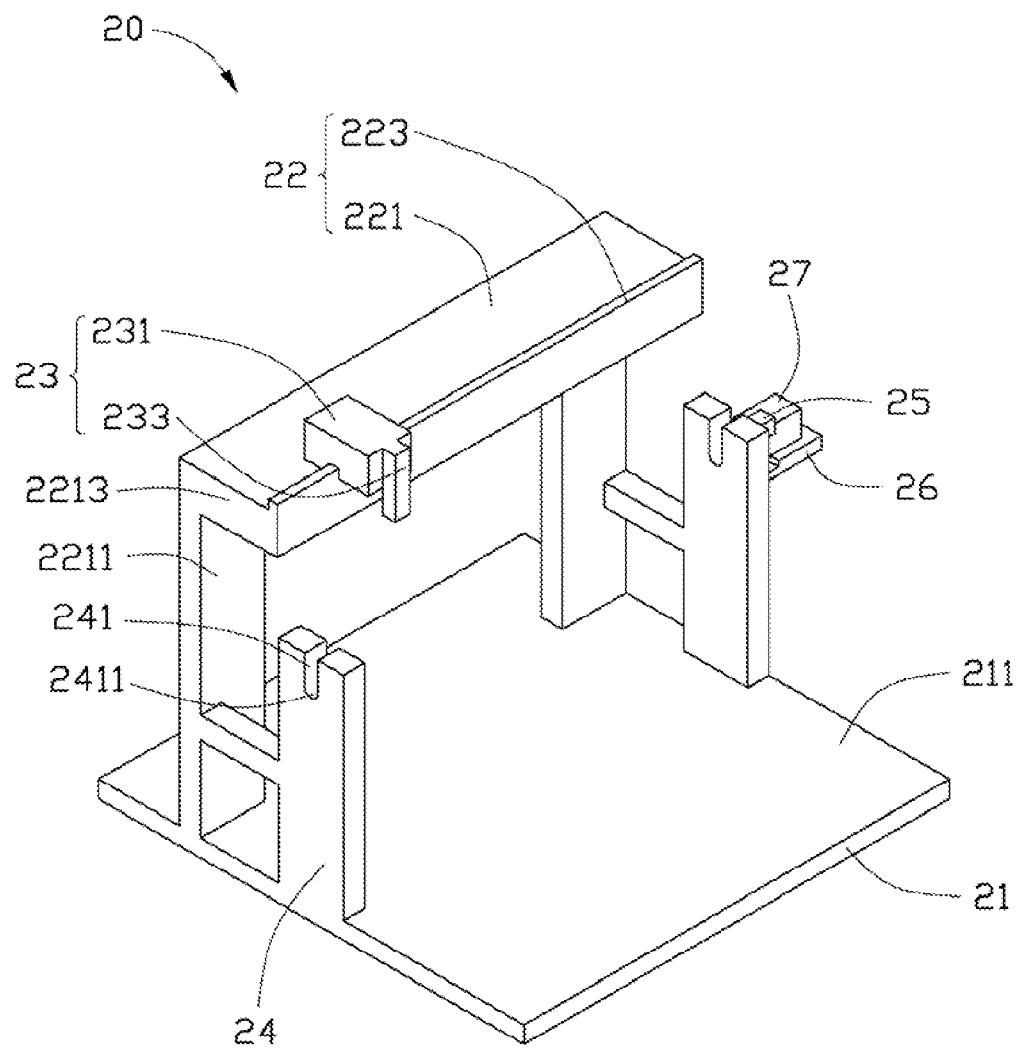
FIG. 2 is an isometric view of a laser machining system utilized in a machining method to machine the roller of FIG. 1.

Referring to FIG. 2, a laser machining system 20 is provided. The laser machining system 20 includes a base 21, a fixing bracket 22, a laser device 23, two support brackets 24, a controller 25, an adjustment device 26, and a driving device 27. The fixing bracket 22 and the support brackets 24 are arranged on the base 21. The laser device 23 is slidably connected to the fixing bracket 22. The controller 25, the adjustment device 26, and the driving device 27 are connected to one of the support brackets 24.

The base 21 is a rectangular plate with an upper surface 211. The fixing bracket 22 includes a support portion 221, which is perpendicularly extending from the upper surface 211 of the base 21, and a slide rail 223. The support portion 221 has two legs 2211 and a connecting part 2213 connecting the legs 2211. The slide rail 223 protrudes from an edge of the connecting part 2213 of the support portion 221. The laser device 23 includes a slider 231, which is slidably engaging with the slide rail 223 of the fixing bracket 22, and a laser head 233 fixed to the slider 231. The laser head 233 can telescopically move along a direction substantially perpendicular to the sliding direction of the slider 231. The laser head 233 is capable of checking the location of the roller 10 and machining the roller 10.

Referring to FIGS. 1 and 2 again, each support bracket 24 defines a mounting portion 241 in one end thereof. In the illustrated embodiment, the support bracket 24 is a plate. The two support brackets 24 are arranged on opposite edges of the upper surface 211 of the base 21 and are respectively arranged near to the two ends of the support portion 221 of the fixing bracket 22. The mounting portion 241 is defined in an upper end of each support bracket 24, and includes an arc surface 2411 (an U-shaped recess surface) to receive the spindle 13 of the roller 10.

The controller 25 is electronically connected to the laser device 23, and used to receive the location signal of the roller 10. Sensing by using the laser device 23 and controlling of the adjustment device 26 can be arranged in any position of the laser machining system 20. In the illustrated embodiment, the controller 25 is fixed to one of the support brackets 24, and adjacent to the mounting portion 241 of the support bracket 24.

Figure 3:
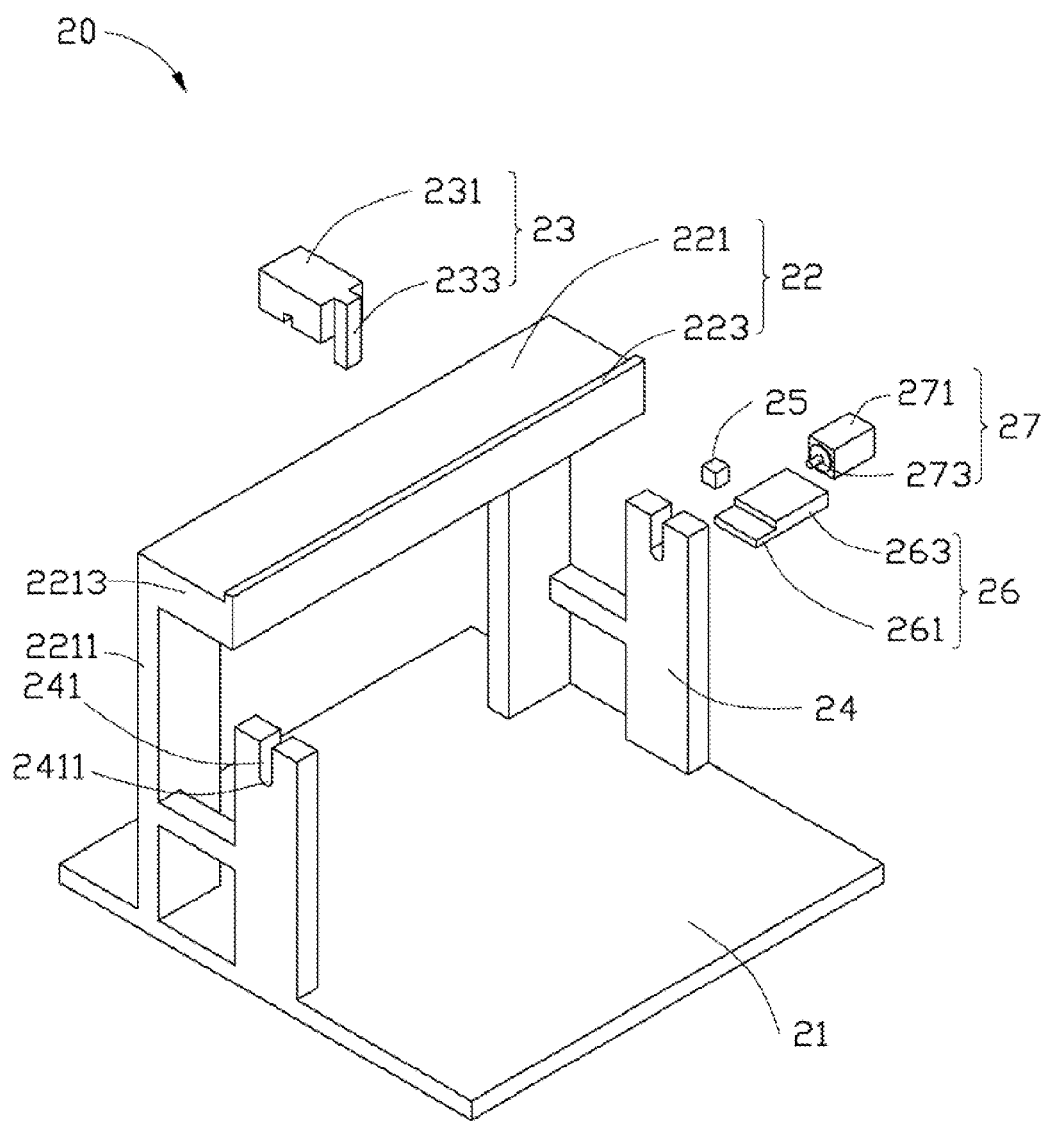
FIG. 3 is an exploded, isometric view of the laser machining system of FIG. 2.

Referring to FIGS. 1 and 3, the adjustment device 26 is fixed to the support bracket 24, which is connected to the controller 25. The adjustment device 26 includes a receiver 261 and an actuator 263. The receiver 261 receives the scanned signals sent by the controller 25. The actuator 263 adjusts the position of the roller 26 according to the scanned signals from the receiver 261. The adjustment device 26 may be arranged on the two support brackets 24 alternatively.

The driving device 27 is a motor, which includes a main body 271 connected to the actuator 263 of the adjustment device 26 and a shaft 273 rotatably connected to the main body 271.

Figure 4:
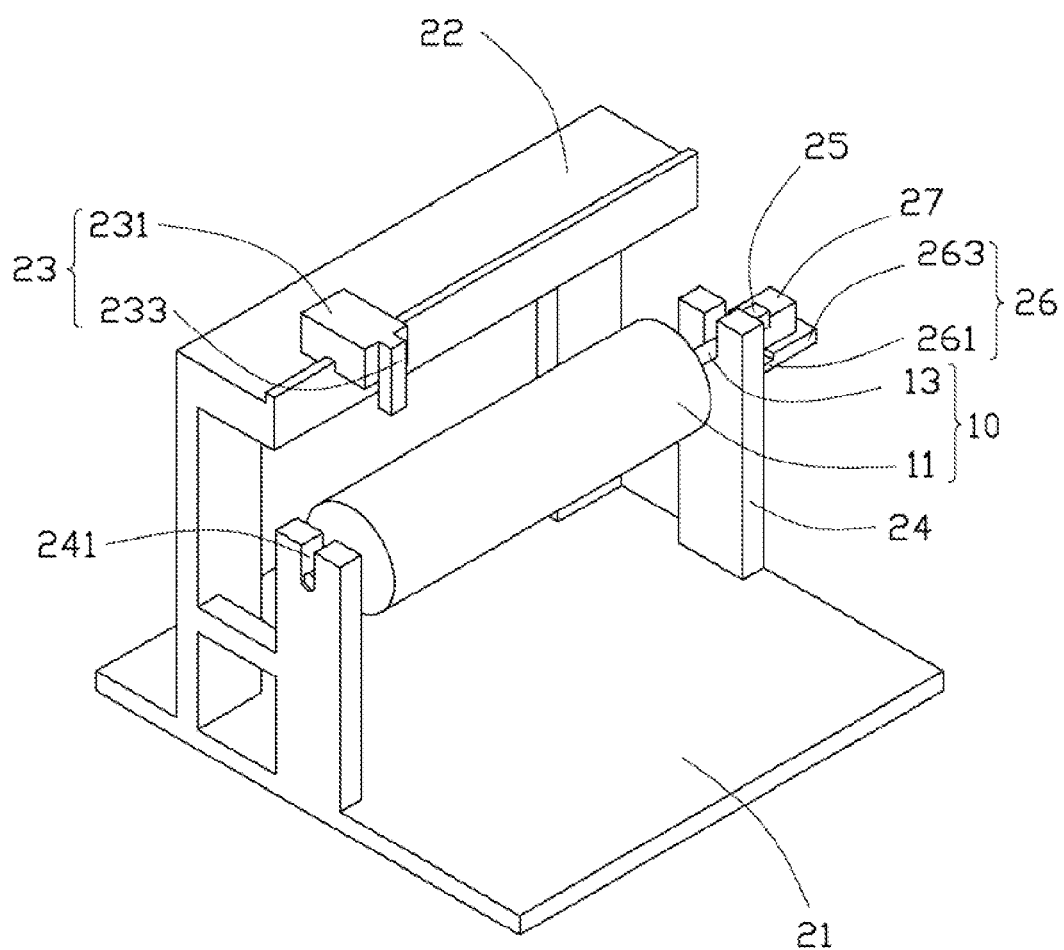
FIG. 4 is similar to FIG. 2, but shows the laser machining system of FIG. 2 machining the roller of FIG. 1.

Referring to FIGS. 3 and 4, the spindles 13 of the roller 10 are positioned in the mounting portions 241 of the support brackets 24, respectively. One of the spindles 13 is connected to the shaft 273 of the driving device 27.

Figure 5:
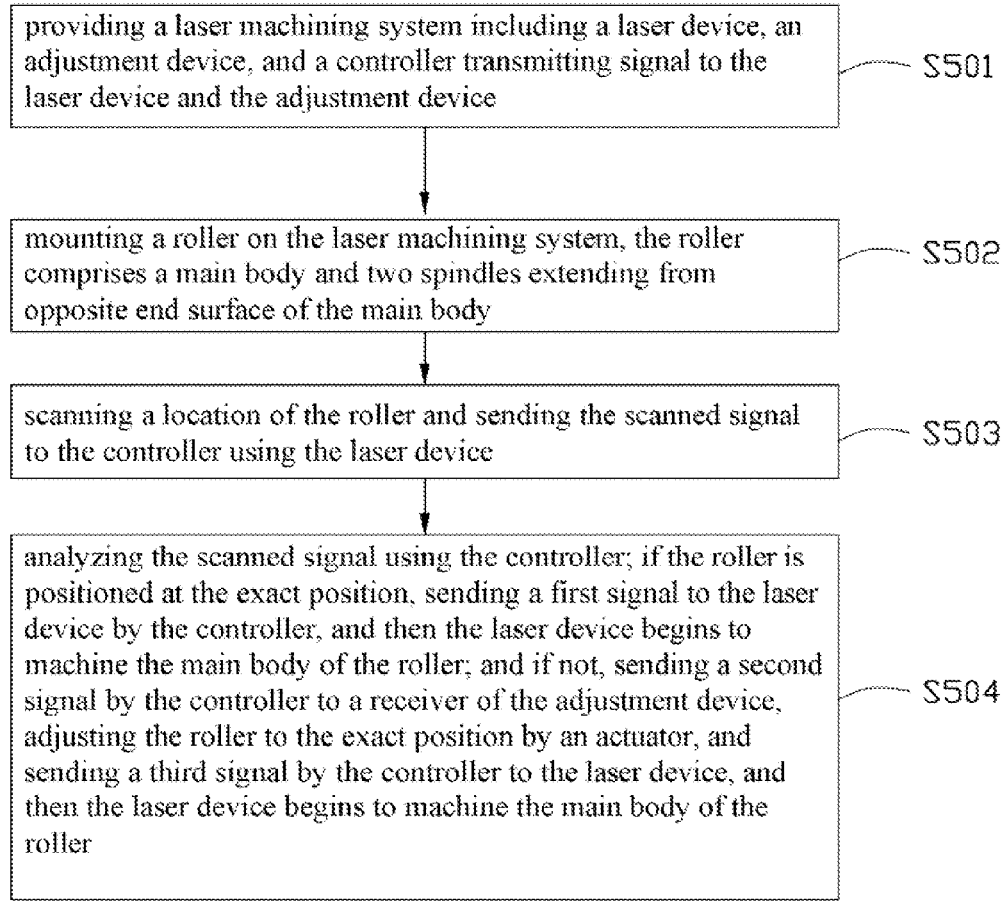
FIG. 5 is a flowchart of a method of machining the roller of FIG. 1, performed by the laser machining system of FIG. 2.

FIG. 5 is a flowchart of a method of machining the roller 10 as follows. The method includes following steps: In step S501, a laser machining system 20, which includes a laser device 21, an adjustment device 23, and a controller 25 is provided. The controller 25 transmits signal to the laser device 21 and the adjustment device 23. In step S502, a roller 10 including a main body 11 and two spindles 23 extending from opposite end surface of the main body 11 is mounted on the laser machining system 20. In step S503, the laser device 21 scans a location of the roller 10 and sends a scanned signal to the controller 25. In step S504, the controller 25 analyzes the scanned signal; if the roller 10 is positioned at the exact position, the controller 25 will send a first signal to the laser device 21, and then the laser device 21 begins to machine the main body 11 of the roller 10; and if not, the controller 25 will send a second signal to the receiver 261 of the adjustment device 26, then the actuator 263 adjusts the roller 10 to the exact position, the controller 25 sends a third signal to the laser device 23, and then the laser device 23 begins to machine the main body 11 of the roller 10.

During a machining process, the laser head 233 of the laser device 23 slides along the slider 231 to machine the roller 10 along the axis of the roller 10. Distance between the laser head 233 and the main body 11 of the roller 10 can be adjusted by telescopic movement of the laser head 233 along a direction perpendicular to the axis of the roller 10. The driving device 27 rotates the roller 10, thus, the whole surface of the roller 10 can be machined continuously, capable of enhancing the machining efficiency.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A method of machining a roller, comprising:
   providing a laser machining system comprising a laser device, an adjustment device, and a controller transmitting signal to the laser device and the adjustment device;
   mounting a roller on the laser machining system, the roller comprises a main body and two spindles extending from opposite end surface of the main body;
   scanning a location of the roller and sending the scanned signal to the controller using the laser device; and
   analyzing the scanned signal using the controller; if the roller is positioned at the exact position, sending a first signal to the laser device by the controller, and then the laser device begins to machine the main body of the roller; and if not, sending a second signal by the controller to a receiver of the adjustment device, adjusting the roller to the exact position by an actuator, and sending a third signal by the controller to the laser device, and then the laser device begins to machine the main body of the roller.

2. The method of machining a roller of claim 1, wherein the laser device comprises a slider and a laser head connected to the slider; the laser machining system comprises a fixing bracket comprising a slide rail slidably engaging with the slider.

3. The method of machining a roller of claim 2, wherein the laser machining system further comprises a base, and the fixing bracket further comprises a support portion perpendicularly extending from an upper surface of the base; the slide rail protrudes from the support portion.

4. The method of machining a roller of claim 3, wherein the support portion comprises two legs perpendicularly to the base and a connecting part connecting the legs; the slide rail protrudes from an edge of the connecting part.

5. The method of machining a roller of claim 1, wherein the laser machining system further comprises two opposite support brackets to support the spindles of the roller.

6. The method of machining a roller of claim 5, wherein each support bracket defines a mounting portion to receive the spindles of the roller.

7. The method of machining a roller of claim 6, wherein the laser machining system further comprises a driving device rotatably connected to the roller.

8. The method of machining a roller of claim 1, wherein the adjustment device comprises the receiver receiving the scanned signals sent by the controller and the actuator adjusting the position of the roller.

* * * * *